March 10, 1953 J. A. ZUBLIN Re. 23,632

DIAMOND DRILL BIT FOR ROTARY WELL DRILLING

Original Filed July 26, 1951 2 SHEETS—SHEET 1

INVENTOR

John A. Zublin

BY Burns, Doane & Benedict

ATTORNEYS

DIAMOND DRILL BIT FOR ROTARY WELL DRILLING

Original Filed July 26, 1951 2 SHEETS—SHEET 2

INVENTOR

John A. Zublin

BY Burns, Doane & Benedict

ATTORNEYS

Reissued Mar. 10, 1953

Re. 23,632

UNITED STATES PATENT OFFICE 23,632

DIAMOND DRILL BIT FOR ROTARY WELL DRILLING

John A. Zublin, Los Angeles, Calif.

Original No. 2,614,809, dated October 21, 1952, Serial No. 238,697, July 26, 1951. Application for reissue November 20, 1952, Serial No. 321,749

6 Claims. (Cl. 255—61)

Matter enclosed in heavy brackets [ ] appears in the original patent but forms no part of this reissue specification; matter printed in italics indicates the additions made by reissue.

This invention relates to a novel diamond drill bit more particularly adapted for drilling in extremely hard formations. The bit is especially applicable to the drilling of relatively small diameter bores deviating from existing well bores.

Diamond rotary core bits have been in use for a number of years which are effective to cut a core having a diameter equal to the interior diameter of a hollow core bit. Commercially, diamond drill bits have been largely limited to core drilling because the diamond cutting elements do not have great resistance to shock or impact loads. The drilling of open well bores with diamond drill bits, that is, bits studded with diamond cutting elements, has presented problems which have not, to applicant's knowledge, been heretofore satisfactorily solved. The cutting of a clean bore, of course, necessitates removal of the formation at the exact center of the well bore as well as at the periphery thereof. A diamond cutting element positioned at the center of the well bore, of course, merely rotates about its own axis and will not long effectively perform any satisfactory cutting operation and, furthermore, will soon shatter because of its inability to stand the strain.

It is among the purposes and objects of the present invention to provide a diamond drill bit which is effective in drilling an open bore and which will have long life in operation in the drilling of hard formations.

More specifically, it is an object of the invention to provide a diamond drill bit effective to remove the outer portion, i. e., peripheral portion, of the formation of the bottom of the bore being drilled while the inner or central portion is allowed to protrude into the bit in the form of a cone, the apex of which coincides with the axis of rotation of the bit.

Through the provision of a diamond bit having a conical recess the exposed wall of which is studded with diamonds, the cone of the formation which extends into the conical recess of the bit is continuously cut away as the drilling proceeds and the diamond cutting elements near the apex of the conical recess of the bit are subjected to relatively little strain since, at that point, the formation being cut is of exceedingly small diameter and easily sheared or broken off.

It is a further and more specific object of the invention to provide the conically recessed diamond studded bit with channels for the circulating fluid which will be effective to free the cutting face of the bit from unwanted detritus.

It is a further and more specific object of the invention to provide a diamond cutting bit having a central conical recess which communicates with a channel for receiving cut-away portions of the formation.

It is a further and more specific object of the invention to provide a diamond drill bit having a conical recess in the cutting face thereof which will be effective under the drilling weight applied to the bit to shear and break off the central portion of the formation being removed by the bit.

Further and more specific objects of the invention will become apparent as the description proceeds, which will be given by reference to the accompanying drawings, wherein Figure 1 is a side elevational view of the diamond drill bit conforming to the present invention.

Figure 1:
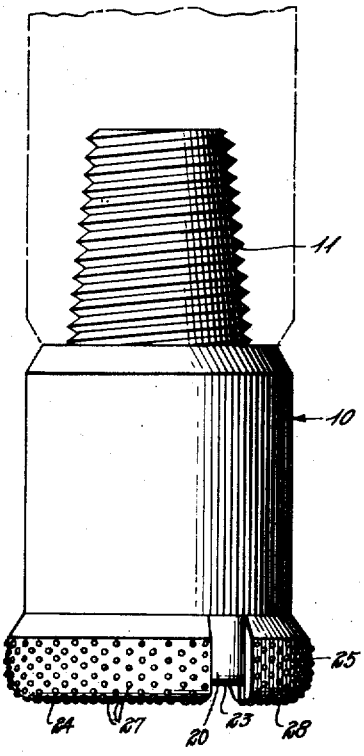
Figure 3:
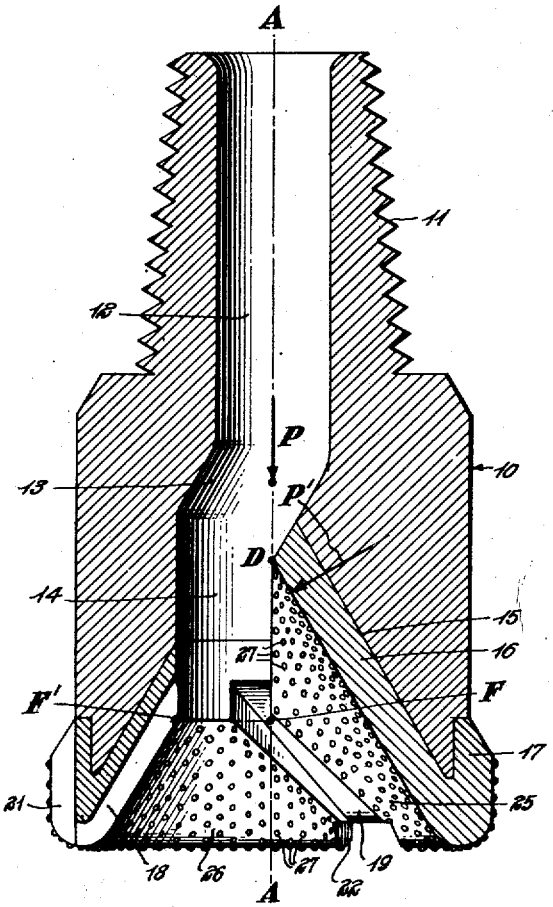
Figure 3 is a cross-sectional view along the line 3—3 of Figure 2.
Figure 2:
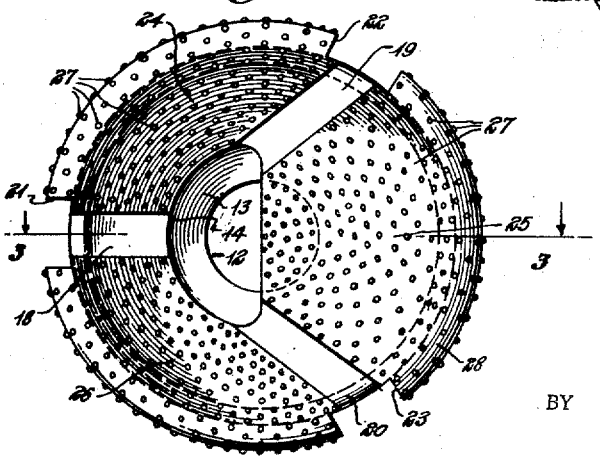
Figure 2 is a bottom plan view of the bit shown in Figure 1.

Referring to Figure 1, the bit body 10 has a threaded shank 11 by which it is adapted to be secured to the lower end of a suitable drill string section for rotation therewith. The bit body 10 and shank 11 have an open channel 12 extending therethrough. The channel 12 is circular at its upper portion but is offset as indicated at 13 and takes the form of a flared semicircular chamber 14 which it will be observed is disposed entirely to one side of a plane perpendicular to Figure 3 extending through the axis A—A of the bit. The bit body 10 has a conical recess defined by the wall 15 to which wall a diamond cutting element carrying matrix 16 is suitably adhered so that, in effect, the bit body 10 and matrix 16 constitute a unitary structure. The matrix 16 covers all of the exposed surface of the conical recess in the bit body 10 and projects upwardly about the annular, marginal, lower end thereof as indicated at 17. The matrix 16 has cut in its exposed face a plurality of grooves 18, 19 and 20 which extend from the semicircular chamber 14 to the periphery of the bit and are cut where they communicate with vertical channels 21, 22 and 23 respectively. The grooves 18—20 and channels 21—23 provide free flow passageways for the circulating fluid employed in the drilling operation which is forced downwardly through the channel 12 in shank 11 thence through the offset portion 13 of the channel into the semicircular chamber 14 thence through the respective grooves 18—20 and then upwardly through the channels 21—23. The lands or spaces between the grooves 18, 19 and 20 and their channel extensions 21, 22 and 23, which lands are designated 24, 25 and 26, carry heterogeneously mounted throughout their exposed areas diamond cutting elements 27.

Figure 4:
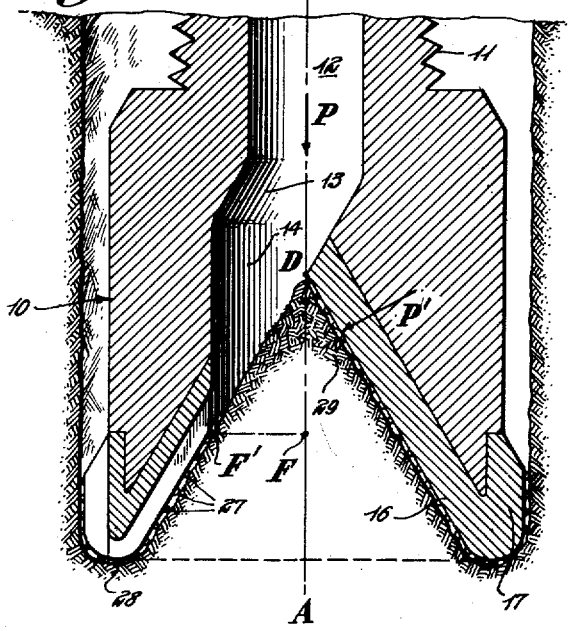
Figure 4 is a fragmentary view similar to Figure 3 but disclosing the bit as it appears in action in the drilling of a well bore.

In operation the entire bit is, of course, rotated by the rotary drill string which extends to the surface of the well. By reference to Figure 4 it will be observed that the matrix 16 embracing its annular upturned portion 17 provides an annular formation cutting face 28 which acts to cut a groove in the formation extending around the circumference of the bore. As the annular cutting face 28 penetrates the formation the upwardly extending lands 24, 25 and 26 carrying the diamond cutting elements 27 cut away what would otherwise be a circular core until it takes the fom of a cone designated 29 having the apex D in the axis of rotation A—A of the bit. The bit is, of course, impelled downwardly by the pressure P through imposition of weight on bit at the surface of the well. The semicircular opening 14 terminates along the line F—F'. It will thus be apparent that that portion of the cone 29 which lies above the plane of the line F—F' and to the left of a plane perpendicular to Figure 4 passing through the axis A—A of the bit will be fully exposed in the semicircular opening 14. Only one half of the conical surface of the bit above the plane of the line F—F' is therefore available to carry diamond cutting elements 27. Under the pressure P representing the weight on bit the cone 29 gradually moves up into the conical recess of the bit, the lower part being cut away at the cutting face 28 and by the diamond cutting elements mounted in the lands 24, 25 and 26. The upper part of the cone 29, of course, has materially less surface and there are materially less diamond cutting elements acting on it. Thus, at the apex D of the cone 29 and for a distance somewhat therebelow, the cone will not be cut away as rapidly as it is at lower portions of its conical surface and there will be a tendency for the cone to bulge out slightly as it approaches the apex D which gives rise to a pressure component indicated P1 in Figure 4. The greater the tendency of the cone to bulge out near the apex, the greater will be the pressure P1 and this pressure is, of course, always directly opposite the semicircular opening 14 and is available to shear and break off the point of the cone above the plane passing through line F—F'. The harder the formation, the nearer the apex D the cone will be sheared or broken away. In softer formations it may well break away near the line F—F'. The chamber 14 is of sufficient size to hold a considerable volume of pieces of formation broken away and sheared away from the cone. These are carried down through the grooves 18, 19 and 20, are further reduced in size and ultimately carried by the circulating fluid upwardly through the channels 21, 22 and 23 and removed from the bottom of the well bore.

If the action of the bit slows down, indicating the chamber 14 may have become filled with broken cone pieces, the pump pressure on the circulating fluid will rise, indicating to the driller at the surface of the well the circumstance that the chamber 14 has become filled or clogged. The driller can then raise the bit for a foot or so from the bottom of the well and the circulating fluid will free the channel 12 and chamber 14 of all the pieces which have collected therein. These will fall into the annular circular groove around the cone and when the bit is again lowered they will be pulvergized and removed.

From the foregoing it will be appreciated that the diamond drill bit of the present invention is not dependent to any great extent upon effective cutting of the diamond cutting elements at the point of dead center of the bit. Indeed, the bit will be effective after the diamond cutting elements near the apex D and conical recess of the bit are substantially worn out.

Figure 7:
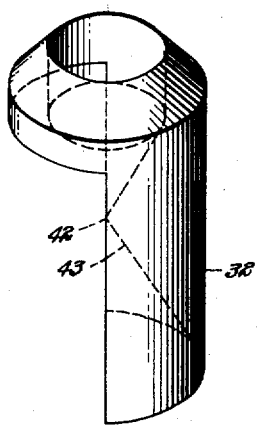
Figure 7 is a detailed view of the removable element of a modification of Figure 5.
Figure 5:
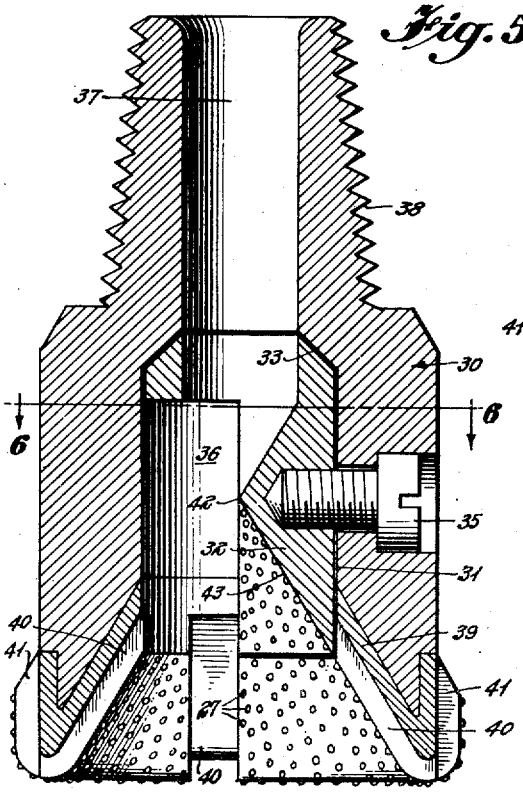
Figure 5 is a cross-sectional view of a modified form of the invention.
Figure 6:
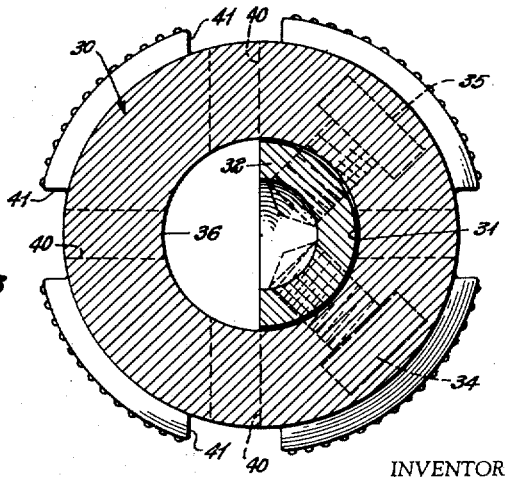
Figure 6 is a cross-sectional view through the complete bit of the modification shown in Figure 5 taken in the direction of the arrows on the plane of the line 6—6 of Figure 5.

In Figures 5, 6 and 7 there is shown a modified form of the invention in which the bit body 30 is recessed at 31 to receive a specially formed plug 32 more particularly shown in Figure 7. The plug 32 seats against the annular shoulder 33 in the recess 31 at its upper end and is held in position in the bit body 30 by the screws 34 and 35. The plug 32 has a semicircular cut-out portion 36 to provide a semicircular chamber quite comparable to chamber 14 of the modification of Figures 1–4. The semicircular chamber 36 communicates with the channel 37 in the shank 38. The diamond cutting element supporting matrix 39 is provided with a series of cut-out grooves 40 and vertical extending channels 41. The plug 32 is so positioned in the recess 31 that three of the grooves 40 open into the semicircular chamber 36 since three of these grooves are positioned to one side of the vertical plane passing through the axis of rotation of the bit (see Figure 6). The lands between the grooves 40 carry heterogeneously mounted diamond cutting elements comparable to the diamond cutting elements 27 in the modification of Figures 1 to 4, and that portion of the plug 32 below the point 42 has a frusta-conical surface 43 which provides an extension of the conical cutting face directly opposed to the semicircular chamber 36. The operation of the modified form of invention as disclosed in Figures 5–7 is the same as the preferred embodiment illustrated in Figures 1–4 and may be resorted to to facilitate ease of manufacture. In all forms of the invention the action of the bit results in the production of a cone or formation extending into the conical recess of the bit, the apex of which is sheared and broken away by the action of a component of pressure applied to the bit in the rotary drilling operation.

Having thus described my invention, what I claim is:

1. A diamond drill bit for drilling in hard formations, comprising a bit body, a channel extending downwardly through said bit body, a conically shaped recess in the bottom of said bit body, the apex of said conical recess lying substantially in the axis of rotation of said bit, a portion of said conical surface less than its circumference being cut away near the apex thereof to provide an open communication from said channel into said conically shaped recess the uncut-away portion of said conical surface being effective under the weight on the bit to continually break away the apex of the conical formation produced by said bit during progressive drilling thereby, a plurality of grooves cut in and extending from said open communication to the periphery of said bit, the sections of said conical surface intermediate said grooves carrying [heterogeneously mounted] diamond cutting elements at least one of said sections of said conical surface terminating substantially at the center of rotation of said bit, and at least one of said sections terminating short of the center of rotation of said bit.

2. A diamond drill bit for drilling in hard formations comprising a bit body, a generally conically shaped recess in the bottom of said bit body, a channel extending downwardly through said bit body and opening into said conical recess well above the base of said bit, a plurality of grooves cut in the conical surface of said conical recess extending from said channel to the periphery of said bit, the segmental sections intermediate said grooves carrying [heterogeneously mounted] diamond cutting elements, at least one of said segmental sections of said conical surface terminating substantially at the center of rotation of said bit, and at least one of said sections terminating short of the center of rotation of said bit.

3. A diamond drill bit for drilling in hard formations comprising a bit body, a generally conically shaped recess in the bottom of said bit body, a channel extending downwardly through said bit body and opening into said conical recess well above the base of said bit, a plurality of grooves cut in the conical surface of said conical recess extending from said channel to the periphery of said bit and extending upwardly from the base of the said bit a substantial distance on the outer wall of the bit body, the segmental sections intermediate said grooves carrying [heterogeneously mounted] diamond cutting elements, at least one of said segmental sections of said conical surface terminating substantially at the center of rotation of said bit, and at least one of said sections terminating short of the center of rotation of said bit.

4. A diamond drill bit for drilling in hard formations comprising a bit body, a generally conically shaped recess in the bottom of said bit body, a channel extending downwardly through said bit body and opening into said conical recess well above the base of said bit, a plurality of grooves cut in the conical surface of said conical recess extending from said channel to the periphery of said bit, the cross sectional area of said channel being greater than the total cross sectional area of said grooves, the segmental sections intermediate said grooves carrying [heterogeneously mounted] diamond cutting elements, at least one of said segmental sections of said conical surface terminating substantially at the center of rotation of said bit, and at least one of said sections terminating short of the center of rotation of said bit.

5. A diamond drill bit for drilling in hard formations comprising a bit body, a generally conically shaped recess in the bottom of said bit body, a channel extending downwardly through said bit body and opening into said conical recess well above the base of said bit, a diamond holding matrix adhered to the generally conical surface of said conical recess and extending to the periphery of said bit, a plurality of circumferentially spaced grooves cut in said matrix extending from said channel to the periphery of said bit, the segmental sections of said conical surface intermediate said grooves carrying [heterogeneously mounted] diamond cutting elements, at least one of said segmental sections of said conical surface terminating substantially at the center of rotation of said bit, and at least one of said sections terminating short of the center of rotation of said bit.

6. A diamond drill bit for drilling in hard formations comprising a bit body, a fluid conducting passageway extending downwardly through said bit body, a substantially conically shaped recess in the bottom of said bit body, the center of said conical recess lying substantially in the axis of rotation of said bit body, said fluid conducting passageway opening into said conical recess, a plurality of grooves cut in the wall of said conical recess and extending from said passageway to the periphery of said bit dividing the surface of said conical recess into a plurality of sections each of which carries [heterogeneously mounted] diamond cutting elements, at least one of said sections extending substantially to the axis of rotation of said bit body, said bit body embracing a removable and replaceable element, a portion of which is adapted to form a part of said section extending substantially to the axis of rotation of said bit body, and at least one of said sections terminating short of the center of rotation of said bit.

JOHN A. ZUBLIN.

REFERENCES CITED

The following references are of record in the file of this patent or the original patent:

UNITED STATES PATENTS

| Number | Name | Date |
|---|---|---|
| 2,217,889 | Carpenter et al. | Oct. 15, 1940 |
| 2,256,092 | Koebel et al. | Sept. 16, 1941 |
| 2,264,440 | Havlick | Dec. 2, 1941 |
| 2,493,178 | Williams | Jan. 3, 1950 |
| 2,558,415 | Bonsall | June 26, 1951 |